United States Patent [19]

Murao

[11] Patent Number: 4,459,657
[45] Date of Patent: Jul. 10, 1984

[54] DATA PROCESSING SYSTEM HAVING RE-ENTRANT FUNCTION FOR SUBROUTINES

[75] Inventor: Yutaka Murao, Tokyo, Japan

[73] Assignee: Tokyo Shibaura Denki Kabushiki Kaisha, Kawasaki, Japan

[21] Appl. No.: 304,711

[22] Filed: Sep. 22, 1981

[30] Foreign Application Priority Data

Sep. 24, 1980 [JP] Japan ................................ 55-132633

[51] Int. Cl.³ ........................ G06F 9/18; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,646,522 | 2/1972 | Furman et al. | 364/200 |
| 3,793,631 | 2/1974 | Siverstein et al. | 364/200 |
| 3,798,615 | 3/1974 | Weisbecker | 364/200 |
| 3,833,888 | 9/1974 | Stafford et al. | 364/200 |
| 3,840,861 | 10/1974 | Amdahl et al. | 364/200 |
| 3,938,098 | 2/1976 | Garlic | 364/200 |
| 4,079,453 | 3/1978 | Dahl | 364/200 |
| 4,079,455 | 3/1978 | Ozga | 364/200 |
| 4,086,627 | 4/1978 | Bennett et al. | 364/200 |
| 4,217,638 | 8/1980 | Namimoto et al. | 364/200 |
| 4,346,438 | 8/1982 | Potash et al. | 364/200 |

OTHER PUBLICATIONS

TMS 9900 Microprocessor Data Manual; Oct. 1976; pp. 3–7, published by Texas Instruments, Inc.

Primary Examiner—Jerry Smith
Assistant Examiner—William G. Niessen
Attorney, Agent, or Firm—Kenyon & Kenyon

[57] ABSTRACT

A data processing system is disclosed which includes a memory having a plurality of addressable register banks and for memory areas for performing a re-entrant function of a subroutine. The memory areas store a start address of an interrupt program, a program status word of the interrupt program, and a register bank pointer code to be used by the interrupt program. The memory has a program counter, a program status word, and a register bank pointer. When an interrupt request is received, the contents of a program counter, the program status word, and the register bank pointer are swapped with the contents of a particular memory area group. Further, by swapping the contents of the program counter with the contents of the register in the register bank which contains in advance the start address of the subroutine to be used, the re-entrant operation of the subroutine may be accomplished.

3 Claims, 5 Drawing Figures

DATA PROCESSING SYSTEM HAVING RE-ENTRANT FUNCTION FOR SUBROUTINES

BACKGROUND OF THE INVENTION

The present invention relates to a data processing system having a re-entrant function for subroutines.

Many current microprocessors adopt the stack pointer system for the linkage of an interrupt and a subroutine. Although the system is capable of many applications, it requires save/restore operations for data in the registers in the interrupt service programs or the like. This causes unavoidable overhead in processing by the central processing unit (hereinafter referred to as CPU).

A prior art technique is disclosed in U.S. Pat. No. 4,217,638 according to which a switching system comprising a plurality of register sets is constructed of general registers. The inventor herein is a coinventor in the aforementioned U.S. Patent which is assigned to the assignee of this application. The present invention provides an improvement over the aforementioned U.S. Patent.

SUMMARY OF THE INVENTION

It is an object of the present invention to provide a data processing system which eliminates the inherent problem of overhead due to the stack pointer system and which is also capable of realizing the general function of the stack pointer system as well as the re-entrant function for subroutines, which is the most advantageous feature of the stack pointer system.

In order to achieve this object, there is provided according to the present invention, in a data processing system having a central processing unit having an internal memory including a plurality of addressable register locations, and a means for addressing said register locations in response to address data stored in a particular address register, the combination comprising, (A) a program counter allocated in said internal memory;

(B) a program status word register allocated in said internal memory;

(C) a plurality of memory areas disposed in said internal memory storing for use of interrupt programs a plurality of sets of a start address, a program status word, and a register bank pointer code; and said central processing unit including a pointer address register storing a first register bank pointer code for designating a first register location group in said internal memory;

a first address register storing a register address code for designating a selected register location in said first register location group which is in turn designated by said first register bank pointer code;

means for combining said first register bank pointer code from said pointer address register with an address code from said first address register, and for generating an address for accessing said selected register location in said first register location group in said internal memory through said addressing means during execution of a first program which may be a so-called main program or an interrupt program;

means for detecting an interrupt request for initiating execution of a second program which is an interrupt program;

means for swapping the respective contents of said program counter, said program status word register, or said pointer address register with one of said plurality of memory areas, in response to said interrupt request.

In the data processing system of the present invention, the register bank pointer codes are switched by said swapping operation so that the linkage operation of the program may be simplified and as described below the re-entrant function of a subroutine may be realized.

BRIEF DESCRIPTION OF THE DRAWINGS

Other objects and features of the present invention will be apparent from the following description when taken in conjunction with the accompanying drawings in which.

DETAILED DESCRIPTION OF THE PREFERRED EMBODIMENTS

Figure 1:
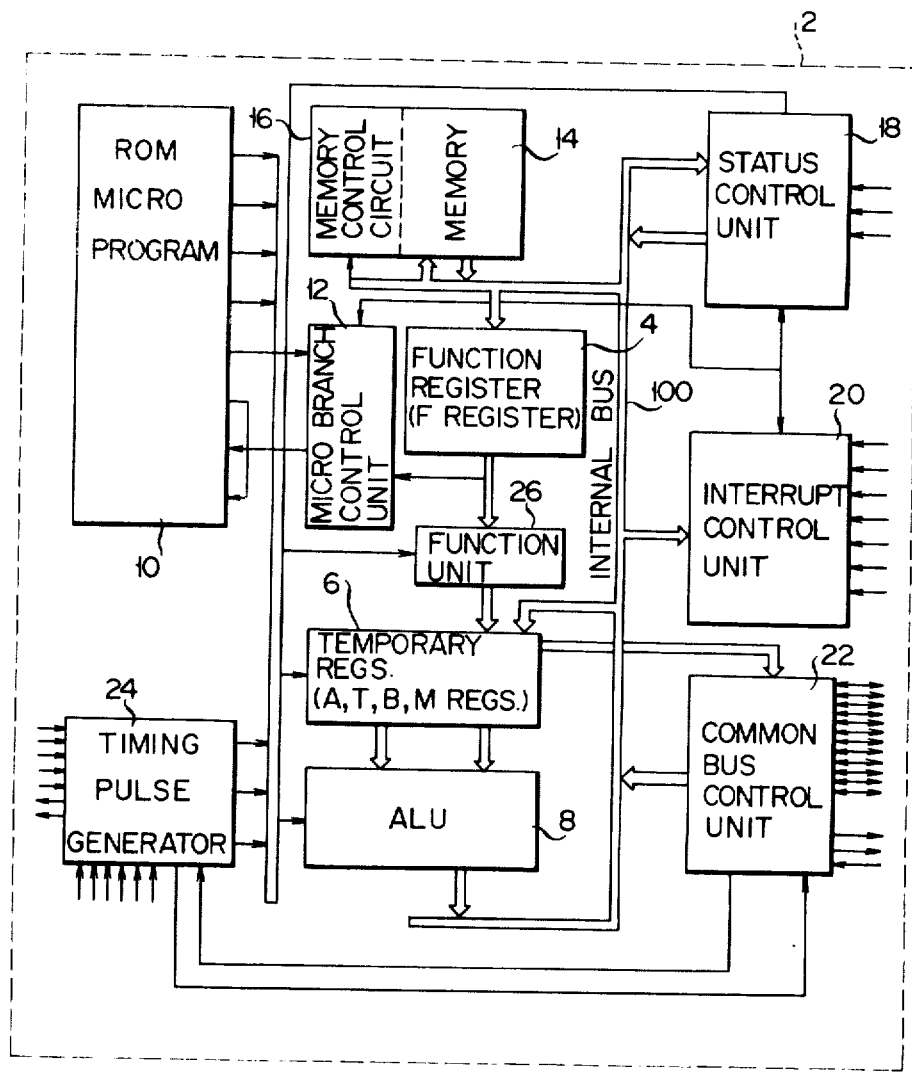
FIG. 1 is a block diagram showing an embodiment of a data processing system of the present invention.

FIG. 1 is a schematic block diagram of a central processing unit (CPU) 2 according to an embodiment of the present invention. The CPU 2 is fabricated on a single chip and comprises a function register 4 (hereinafter referred to as F register) for storing an instruction to be executed; temporary registers (A, T, B and M) 6 for temporarily storing data supplied from the function register 4; an arithmetic logic unit 8 for effecting arithmetic logic operations such as addition, subtraction, AND functions, OR functions and shift functions of data transferred from the temporary registers 6; a ROM microprogram 10 for storing data which controls the operational sequences of the CPU 2; a microbranch control unit 12 for controlling branching of the microprogram; a memory 14 having a plurality of register groups (e.g., 8) acting as register banks, a program counter for storing an address of the instruction to be executed and a program status word; a memory control circuit 16 having register bank pointers for designating memory groups used as register banks of the memory 14; a status control unit 18 having a flip-flop register for storing current statuses of the CPU 2 such a carry flag and zero flag and a circuit for controlling the status of the flip-flop register; an interrupt control unit 20 for detecting and selecting the highest priority interrupt request when a plurality of interrupt requests are generated simultaneously; a common bus control unit 22 for controlling transfer of data between the CPU and external memory of input/output devices; a timing pulse generator 24 for generating clock pulses defining timing for storing data into and reading data from the function register 4, the temporary registers 6, general registers, and so forth; and a special function unit 26 used, for example, for bit manipulation such as sign extension.

In the CPU of the data processing system of the present invention, data is transferred between the respective blocks of the CPU in a manner similar to that in the prior art with the same kinds of control signals used.

Therefore, the description of data transfer and control signals will be omitted.

Figure 2:
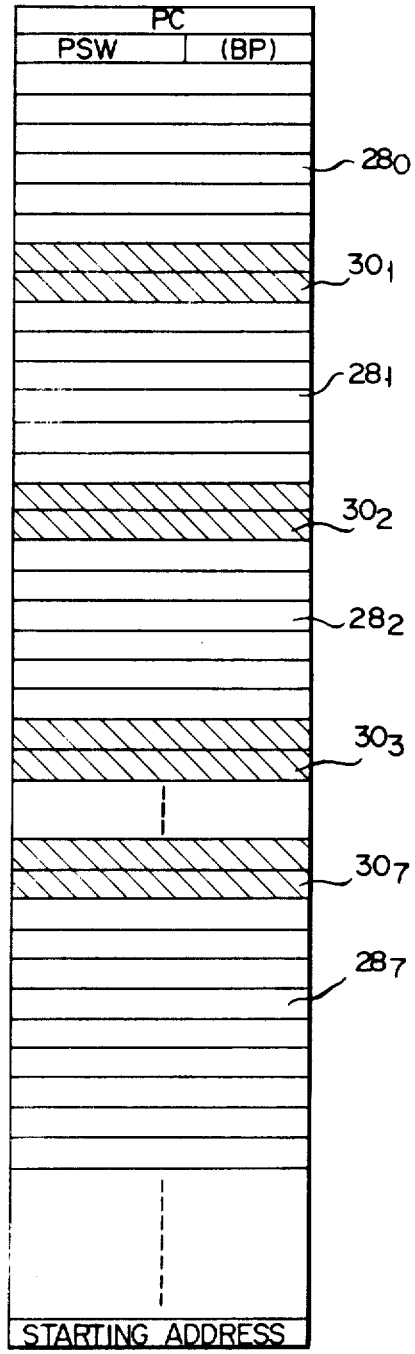
FIG. 2 is a map of register banks allocated in a memory of the system of FIG. 1.

The memory 14 comprises a random access memory (RAM) and is constructed as shown in FIG. 2. The reference numerals $28_0$ to $28_7$ designate register banks; eight such register banks are used in this embodiment. Each register bank comprises 6 general registers and one of the RAM areas designated $30_1$ to $30_7$. Each register has a register address and a RAM address. The register addresses of each bank are denoted by R2 to R7. Registers R0 and R1 are included in the RAM in addition to the respective bank registers. When Ri (where i=0 to 7) is designated, the ith register of a particular register bank is selected.

The register addresses for each register bank are R2 to R7 so that register addresses for different register banks are not unique. The RAM addresses, on the other hand, are unique and serial. When the locations number of word memory of the RAM including the resisters is (n+1), the RAM addresses are designated 0 to n. Each register address may be selected either by the register address or the RAM address. The register corresponding to the address R0 is a program counter (hereinafter referred to as PC), and the register corresponding to the address R1 stores a program status word (hereinafter referred to as PSW) which includes a register bank pointer (hereinafter referred to as BP). The PC and PSW are common to all of the register banks. The register bank pointer BP designates the current register bank. Since there are only 8 register banks in this embodiment, the bank pointer BP in the program status word PSW may be of 3-bit configuration. Addresses 8N and 8N+1 (where N=1 to 7) are not registers but are general RAMs. Since the PC and PSW are common to all of the banks, the RAM areas $30_1$ to $30_7$ are constructed as shown in FIG. 2 for efficiency in address decoding. In these RAM areas $30_1$ to $30_7$ are stored, for example, start addresses and program status words for use in interrupt programs. For the embodiment of FIG. 2, the RAM areas designated by address 8 and address 9 correspond to an interrupt level 1; address 16 and address 17, to an interrupt level 2; address 24 and address 25, to an interrupt level 3; address 32 and address 33, to an interrupt level 4; address 40 and address 41, to an interrupt level 5; address 48 and address 49, to an interrupt level 6; and address 56 and address 57, to an interrupt level 7, respectively.

Figure 3:
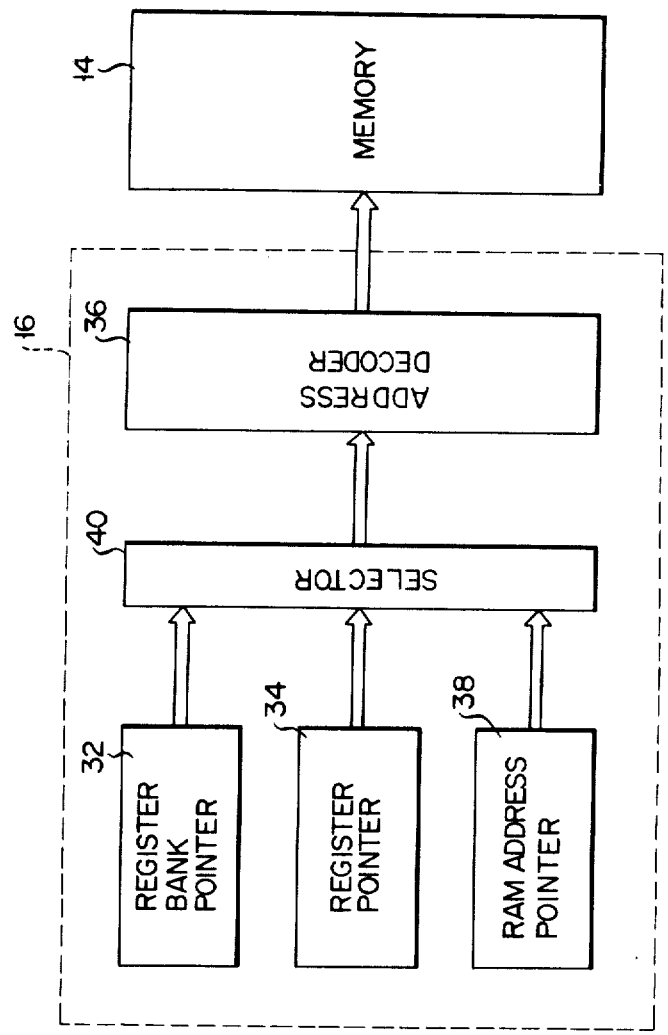
FIG. 3 is a detailed block diagram showing the memory control circuit of FIG. 1.

FIG. 3 is a detailed block diagram of the memory control circuit 16 shown in FIG. 1. The memory control circuit 16 has a register bank pointer 32. This register bank pointer 32 designates one of the register banks $28_0$ to $28_7$ assigned in the RAM. If the contents of the register bank ponter are "000", the register bank $28_0$ is selected. If the contents are "111", the register bank $28_7$ is selected. A register pointer 34 designates the register R2 to R7 of the register bank specified by the register bank pointer 32.

If the contents of the register pointer 34 are "000", the register R0 is selected. If the contents are "111", the register R7 is selected. The output terminals of the register bank pointer 32 and the register pointer 34 are connected to the input terminal of an address decoder 36.

The memory areas for 64 words in the RAM have register addresses and RAM addresses. For accessing a location as a register, the register bank pointer 32 and the register pointer 34 are selected as paired by a selector 40. The address decoder 36 receives the output from the register bank pointer 32 as the 3 more significant bits of a bit address, and receives the output of the register pointer 34 as the 3 less significant bits. The address decoder 36 decodes the 6 bits as a 6-bit address and provides an output which selects a particular register in a particular register bank of the memory 14.

For accessing a location as a RAM address, a RAM address pointer 38 is selected by the selector 40, and the address decoder 36 receives the 6-bit output therefrom as an address.

When a register and register bank are specified as described above, the subroutine linkage is performed in a manner similar to that in a conventional system as follows:

| Symbol | CALL side OP code | Operand |
|---|---|---|
| (a) | LDI | R7, = SUBA |
| (b) CALL | WR | R0, R7 |
| | Subroutine side | |
| Symbol | OP code | Operand |
| SUBA | — | (entry) |
| (c) | — | |
| | LR | R0, R7 (return) |

As for the meanings of the OP codes, LDI indicates "load register with immediate data", WR indicates "swap the contents of two registers", and LR indicates "load register with register". In response to an instruction (a) above, a subroutine start adress SUBA of the subroutine is stored in the currently used register bank, for example, in the register R7. This may be accomplished by directly storing in the register R7 the address SUBA read out from the program memory 10, through a temporary register 6 and the ALU 8. In response to an instruction (b), the contents of the register R0 as the program counter PC are swapped with the contents of the register R7.

Referring to FIGS. 1 and 2, the method for swapping is described step by step as follows:

(1) The contents of the register R0 are read out from the memory 14 onto an internal bus 100 and are written in the register A among the temporary registers 6.

(2) Similarly, the contents of the register R7 are read out from the memory 14 onto the internal bus 100 and are written in the register B of the temporary registers 6.

(3) The contents of the register A are output onto the internal bus 100 after passing through the ALU and are written in the register R7 of the memory 14. The function of the ALU in this case is a "through function"; i.e., the ALU directly outputs the input from the register A.

(4) The contents of the register B are output onto the internal bus 100 after passing through the ALU and are written in the register R0 of the memory 14. The function of the ALU in this case is the same as in step (3) above; i.e., the ALU directly outputs the input from the register B.

The contents of the registers R0 and R7 are thus swapped.

During execution of instruction (b), the program counter PC holds the address of an instruction subsequent to the instruction specified by CALL, that is, it holds the return address (this is a well-known function of a microprocessor in general). Thus, the register R0 (PC) contains the return address, and the register R7 contains the subroutine start address SUBA. During execution of instruction (b), the swapping operation R0←SUBA (start address of the Subroutine)

R7←return address is performed. Upon execution of this instruction, a jump to the subroutine start address SUBA and the storing of the return address in the register R7 are simultaneously performed. In the execution of instruction (c), since the return address is stored in the register R7 during execution of instruction (b), the contents of the register R7 are read out to the temporary registers 6 and are written in register R0, thus accomplishing the return from the subroutine.

Figure 4:
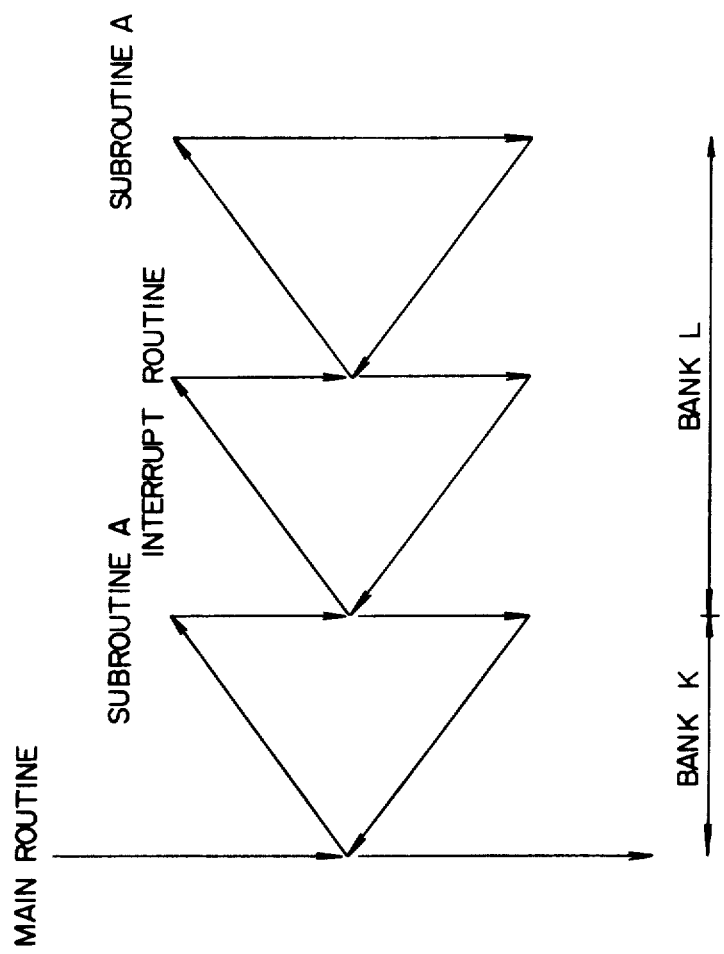
FIG. 4 is a schematic view showing the principle of the re-entrant function according to the data processing system of the present invention.
Figure 5:
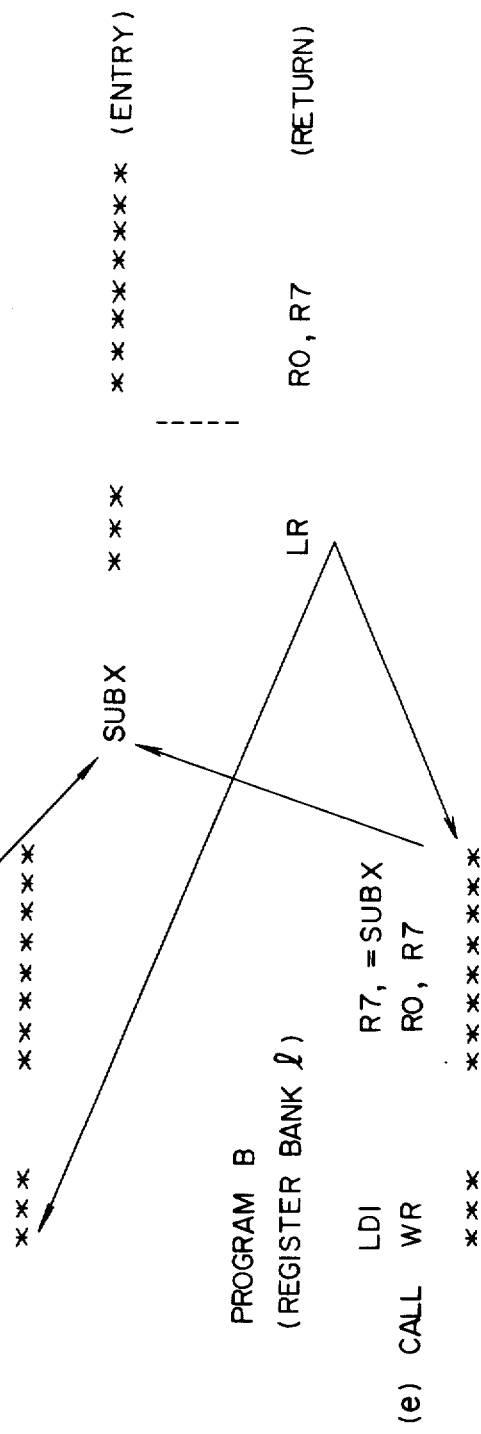
FIG. 5 is a view showing part of a program corresponding to the re-entrant function shown in FIG. 4.

The manner according to which the re-entrant function of the subroutine is accomplished will now be described based on the above operation. When a system is said to be capable of realizing a re-entrant function, it means that when an interrupt request of higher priority is received during the execution of a subroutine at a main program level or a certain interrupt level, the same subroutine can be called and executed in the interrupt program of said newly received interrupt. This is shown in FIG. 4. When an interrupt request is received, the contents of the PC and PSW are swapped with the contents of one of the RAM areas $30_1$ to $30_7$ to freely switch the code of the register bank pointer BP. Therefore, as shown by operations (d) and (e) of FIG. 5, the same subroutine may be called within the main routine and the interrupt routine.

For executing the interrupt program, swapping of the contents of the registers R0 and R1 with those of a particular RAM area (e.g., address 8 and address 9 which correspond to $30_1$) is performed by hardware. When an interrupt request is received, the CPU checks the interrupt level and swaps the contents of registers R0 and R1 with the contents of the particular RAM area corresponding to the interrupt level among the particular areas $30_1$ to $30_7$. When the interrupt level is 1, for example, the contents of address 8 and address 9 are swapped with the contents of the registers R0 and R1. The register bank to be used is specified by the BP of the PSW. In the initial routine of the main program, the contents of the PC and PSW corresponding to the interrupt routines of the respective interrupt levels are set in advance in the RAM areas. The start address of the interrupt routine of the interrupt level 1 is set in address 8, and a desired PSW value is set in address 9 before this interrupt routine is entered.

When a subroutine SUB is called for in operation (d), register bank k is used since the code of the register bank pointer BP is k. Registers R2 to R7 used in the subroutine all belong to the register bank k. When the subroutine SUB is called for in operation (e), register bank l is used. If $k \neq l$, the registers R2 to R7 to be used after operation (e) belong to an entirely different RAM area from the registers R2 to R7 used already in the CALL operation of (d). Therefore, one CALL operation will not affect another CALL operation. Since the contents of the registers R0 (=PC) and R1 (PSW) are saved upon reception of the interrupt request by being swapped with the contents of the corresponding areas among the RAM areas $30_1$ to $30_7$, they are not last.

The number of working registers used in the subroutine is important. The present invention also provides for the situation in which the number of registers R2 to R7, i.e., 6, in a register bank is insufficient. According to the invention, another register bank can be used and a change made in the contents of the register bank pointer BP. For example, when two register banks need to be used in a subroutine, the BP code is incremented by 1 and a second register bank is used. To increment the BP code by 1, the contents of the PSW containing the BP code are read out to the ALU 8 which increments the BP code by 1 and returns it to the original PSW. If k=2 and l=4 in the two CALL operations described above, the register banks $28_2$ and $28_3$ are used in a program A, and the register banks $28_4$ and $28_5$ are used in a program B so that the two call operations do not interfere with each other. To return, the BP code is decremented by 1 at the ALU 8 in a manner similar to that for incrementing to return it to its previous value, and the instruction

LR R0, R7 is executed.

With this construction, a subroutine which is bank-independent may be easily prepared. The present invention is not limited to this embodiment, but various changes and modifications may be made. For example, the bank pointer code need not be stored in the PSW but may be stored in another save area. The particular area for saving the data of PC and PSW may be located anywhere, as long as it is recognizable by the CPU.

What is claimed is:

1. In a data processing system having a central processing unit having an internal memory including a plurality of addressable register locations, and a means for addressing said register locations in response to address data stored in a particular address register, the combination comprising, (A) a program counter register allocated in said internal memory;

(B) a program status word register allocated in said internal memory;

(C) a plurality of memory areas disposed in said internal memory storing for use of interrupt programs a plurality of sets of a start address, a program status word, and a register bank pointer code;

said central processing unit including:

a pointer address register storing a first register bank pointer code for designating a first register location group in said internal memory;

a first address register storing a register address code for designating a selected register location in said first register location group designated by said first register bank pointer code;

means for combining said first register bank pointer code from said pointer address register with an address code from said first address register, and for generating an address for accessing said selected register location in said first register location group in said internal memory through said addressing means during execution of a first program which may be a so-called main program or an interrupt program;

means for detecting an interrupt request for initiating execution of a second program which is an interrupt program; and means for swapping the respective contents of said program counter register, said program status word register, or said pointer address register with one of said plurality of memory areas in response to said interrupt request and for swapping the contents of said program counter register with the contents of one of the registers in the register location group which is selected by the current value of said pointer address register.

2. A data processing system according to claim 1, wherein said plurality of memory areas are arranged according to interrupt levels.

3. A data processing system according to claim 1, wherein said central processing unit includes means for storing a start address of a subroutine to be called in one of said registers of a currently used register bank; and wherein said means for swapping of the central processing unit swaps the contents of said register in which said start address of said subroutine is stored with the contents of said program counter.

* * * * *